United States Patent
Kimmel et al.

(10) Patent No.: US 11,157,194 B2
(45) Date of Patent: Oct. 26, 2021

(54) AUTOMATED PREDICTIVE TIERED STORAGE SYSTEM

(71) Applicant: INTERNATIONAL BUSINESS MACHINES CORPORATION, Armonk, NY (US)

(72) Inventors: Peter R. Kimmel, Kaiserslautern (DE); Thorsten Muehge, Budenheim (DE); Erik Rueger, Ockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

(21) Appl. No.: 15/869,580

(22) Filed: Jan. 12, 2018

(65) Prior Publication Data

US 2019/0220217 A1      Jul. 18, 2019

(51) Int. Cl.
*G06F 3/06* (2006.01)
*G06F 17/15* (2006.01)

(52) U.S. Cl.
CPC .......... *G06F 3/0649* (2013.01); *G06F 3/0604* (2013.01); *G06F 3/0638* (2013.01); *G06F 3/0685* (2013.01); *G06F 17/156* (2013.01)

(58) Field of Classification Search
None
See application file for complete search history.

(56) References Cited

U.S. PATENT DOCUMENTS

| | | | |
|---|---|---|---|
| 8,024,542 B1 * | 9/2011 | Chatterjee | G06F 11/008 711/154 |
| 8,140,775 B1 * | 3/2012 | Chatterjee | G06F 11/3452 711/154 |

(Continued)

FOREIGN PATENT DOCUMENTS

| | | |
|---|---|---|
| WO | 2012146998 A1 | 11/2012 |
| WO | 2013072232 A1 | 5/2013 |
| WO | 2013147783 A1 | 10/2013 |

OTHER PUBLICATIONS

Alshawabkeh et al., "Automated Storage Tiering Using Markov Chain Correlation Based Clustering", Machine Learning and Applications (ICMLA), 2012 IEEE, 11th International Conference on Machine Learning and Applications Date of Conference: Dec. 12-15, 2012, pp. 1-6.

(Continued)

*Primary Examiner* — Charles J Choi
(74) *Attorney, Agent, or Firm* — Alexis N. Hatzis

(57) ABSTRACT

The invention relates to a tiered storage system comprising tiers of data storage. The tiered storage system further comprises a processor; and a memory coupled to the processor. The memory comprises instructions which, when executed by the processor, cause the processor to: receive usage data descriptive of usage of memory extents stored by the tiered storage system; identify periodic usage patterns of the memory extents at least partially by calculating a correlation coefficient between the usage data and a predetermined list of conditions; determine a projected data usage for each of the memory extents using the periodic usage patterns, wherein the projected data usage is temporally dependent; sort the memory extents into usage bins according to the projected data usage; and control the tiers of data storage to migrate the at memory extents between the tiers of data storage using temporal changes of the sorting into the usage bins.

18 Claims, 9 Drawing Sheets

(56) References Cited

U.S. PATENT DOCUMENTS

| | | | |
|---|---|---|---|
| 8,381,213 B1 | 2/2013 | Naamad et al. | |
| 8,429,346 B1 | 4/2013 | Chen et al. | |
| 8,719,645 B2 | 5/2014 | Chiu et al. | |
| 8,738,975 B2 | 5/2014 | Chiu et al. | |
| 8,838,927 B2 | 9/2014 | Chiu et al. | |
| 8,856,476 B2 | 10/2014 | Chiu et al. | |
| 8,880,835 B2 | 11/2014 | Benhase et al. | |
| 9,104,316 B2 | 8/2015 | Chiu et al. | |
| 9,317,215 B2 | 4/2016 | Chen et al. | |
| 9,323,682 B1 | 4/2016 | Marshak et al. | |
| 9,389,807 B2 | 7/2016 | Chiu et al. | |
| 9,411,539 B2 | 8/2016 | Chiu et al. | |
| 9,477,428 B2 | 10/2016 | Chiu et al. | |
| 9,658,896 B2 | 5/2017 | Chiu et al. | |
| 9,703,664 B1 * | 7/2017 | Alshawabkeh | G06F 3/061 |
| 2013/0158950 A1 * | 6/2013 | Cohen | G06F 17/00 |
| | | | 702/176 |
| 2013/0185493 A1 * | 7/2013 | Benhase | G06F 12/128 |
| | | | 711/105 |
| 2015/0355837 A1 * | 12/2015 | Bish | G06F 3/061 |
| | | | 711/114 |
| 2017/0038816 A1 * | 2/2017 | Madsen | G06F 1/3206 |
| 2017/0139833 A1 | 5/2017 | Barajas Gonzalez et al. | |
| 2017/0249551 A1 * | 8/2017 | Iljazi | G06F 3/0619 |
| 2019/0121715 A1 * | 4/2019 | Jameson | G06F 11/3055 |

OTHER PUBLICATIONS

Wikihow, https://www.wikihow.com/Calculate-Spearman's-Rank-Correlation-Coeff. . . , "How to Calculate Spearman's Rank Correlation Coefficient", printed Jan. 12, 2018, pp. 1-4.

* cited by examiner

AUTOMATED PREDICTIVE TIERED STORAGE SYSTEM

BACKGROUND

The invention relates to storage and backup systems, and more particularly to tiered storage systems.

Tiered storage systems store data using a variety of different storage systems. The different storage is divided into tiers based on its response time. Data which is used less often can be stored on tiers that have a longer response time. Data which is used frequently or which has been given priority can be stored in tiers that respond more quickly.

SUMMARY

The invention relates to a tiered storage system. The tiered storage system comprises two or more tiers of data storage. The tiered storage system further comprises a processor. The tiered storage system further comprises a memory coupled to the processor. The memory comprises instructions, which when executed by the processor, cause the processor to receive usage data descriptive of usage of at least one memory extent stored by the tiered storage system. The instructions further cause the processor to identify periodic usage patterns of the at least one memory extent by at least partially by calculating a correlation coefficient between the usage data and a predetermined list of conditions.

Execution of the instructions by the processor further cause it to determine a projected data usage for each of the at least one memory extent using the periodic usage patterns. The projected data usage is temporally or time dependent. Execution of the instructions further cause the processor to sort the at least one memory extent into usage bins at least partially according to the projected data usage. The sorting into usage bins is temporally dependent. Execution of the instructions further cause the processor to control the two or more tiers of data storage to migrate the at least one memory extent between the two or more data tiers of storage using temporal changes of the sorting into the usage bins.

A tier of data storage is a modality or type of data storage. For example a storage system may be comprised of different types of memory which are related by different access times. In one example a tier could be an SSD drive. In other examples there may be enterprise class or consumer class storage. In other examples a memory tier could be remote storage accessed using a cloud interface. In other examples tiers of data storage could be represented by tapes or long term memory that has a slower access time.

According to a further embodiment of the present invention, the invention further provides for a method of operating a tiered storage system. The tiered storage system comprises two or more tiers of data storage. The method comprises: receiving usage data descriptive of usage of at least one memory extent stored by the tiered storage system; identifying periodic usage patterns of the at least one memory extent at least partially by calculating a correlation coefficient between the usage data and a predetermined list of conditions; determining a projected data usage for each of the at least one memory extent using the periodic usage patterns, wherein the projected data usage is temporally dependent; sorting the at least one memory extent into usage bins at least partially according to the projected data usage, wherein the sorting into usage bins is temporally dependent; and migrating the at least one memory extent between the two or more tiers of data storage using the usage bins.

According to a further embodiment of the present invention, the invention further provides for a computer program product for operating a tiered storage system. The computer program product comprising a computer readable storage medium having program instructions embodied therewith. The computer readable storage medium is not a transitory signal per se, the program instructions executable by a processor to cause the tiered storage system to perform a method comprising: receiving usage data descriptive of usage of at least one memory extent stored by the tiered storage system; identifying periodic usage patterns of the at least one memory extent at least partially by calculating a correlation coefficient between the usage data and a predetermined list of conditions; determining a projected data usage for each of the at least one memory extent using the periodic usage patterns, wherein the projected data usage is temporally dependent; sorting the at least one memory extent into usage bins at least partially according to the projected data usage, wherein the sorting into usage bins is temporally dependent; and migrating the at least one memory extent between the two or more tiers of data storage using the usage bins.

Embodiments of the present invention and/or examples described herein can be freely combined with each other if they are not mutually exclusive.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
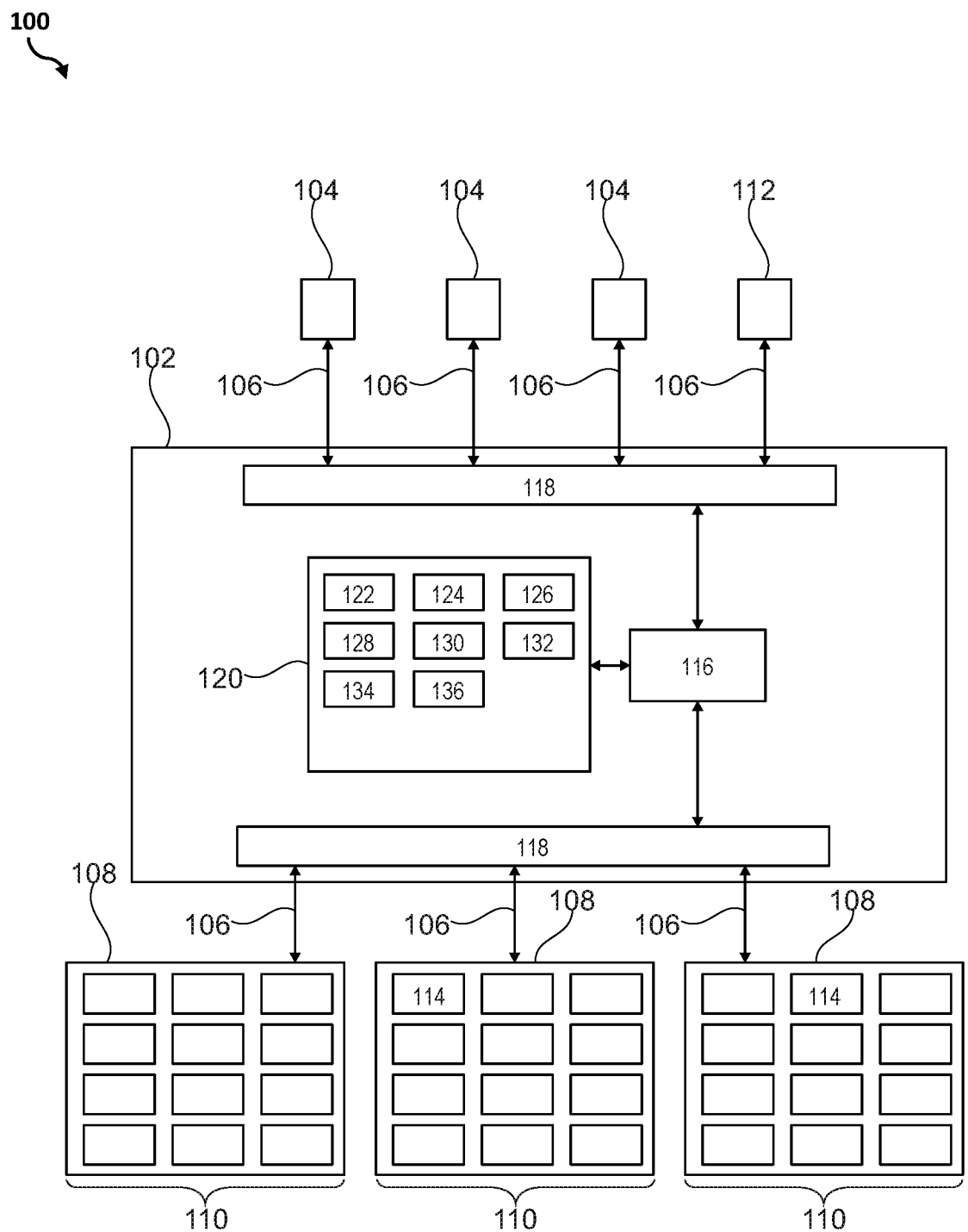
FIG. 1 depicts an implementation of a tiered storage system.

FIG. 1 illustrates an example of a tiered storage system 100. The tiered storage system 100 comprises in this particular example a computer 102 connected via network connections 106 to tiers of data storage 108. The Fig. also shows a number of systems 104 that are requesting data from the tiered storage system 100. The systems requesting data 104 request this via a network connection 106 also. The network connections 106 are intended to represent various types of network connections such as an Ethernet, internet connection, fiber optic, Wi-Fi, Bluetooth, cellular data connection, or other data connection. The various tiers of data storage 108 are also intended to represent different types of storage such as an SSD, enterprise class tiers, a consumer class tier, an external cloud data, tape, or optical storage. Each of the tiers of data storage 108 comprise numerous data storage locations 110. The tiered storage system 100 may also be optionally connected to one or more sources 112 of an external data stream. Several memory extents 114 are shown as being stored in different tiers 108.

The computer 102 is shown as comprising a processor 116 that is connected to a memory 120 and several network connectors 118. The memory 120 may comprise instructions 122 for implementing the tiered storage system. The memory 120 may also comprise usage data 124. The usage data 124 could be collected real time from the various tiers of data storage 108 or it could also be migrated with various data that is migrated to the storage tiers 108. The memory 120 is also shown as containing an optional data stream 126 that was received from the source 122 of external data streams. The memory 120 is further shown as containing a periodic usage pattern 128. The periodic usage pattern may be determined in different ways. For example the periodic usage pattern 128 could be determined by calculating a correlation coefficient between the usage data 124 and the optional data stream 126 and/or different time intervals. The periodic usage patterns 128 may also be determined by Fourier transforming the usage data 124 and identifying patterns within the Fourier transformed data.

The memory 120 is further shown as containing correlation coefficients 130 that were calculated between the usage data 124 and/or the optional data stream 126. The memory 120 is further shown as containing projected data usage 132 that was calculated from the periodic usage patterns 128. The memory 120 is further shown as containing a sorting 134 of memory extents 114 into usage bins. The memory 120 is further shown as containing commands 136 that may be sent to the tiers 108 to migrate one or more of the memory extents 114 to a different tier 108.

Figure 2:
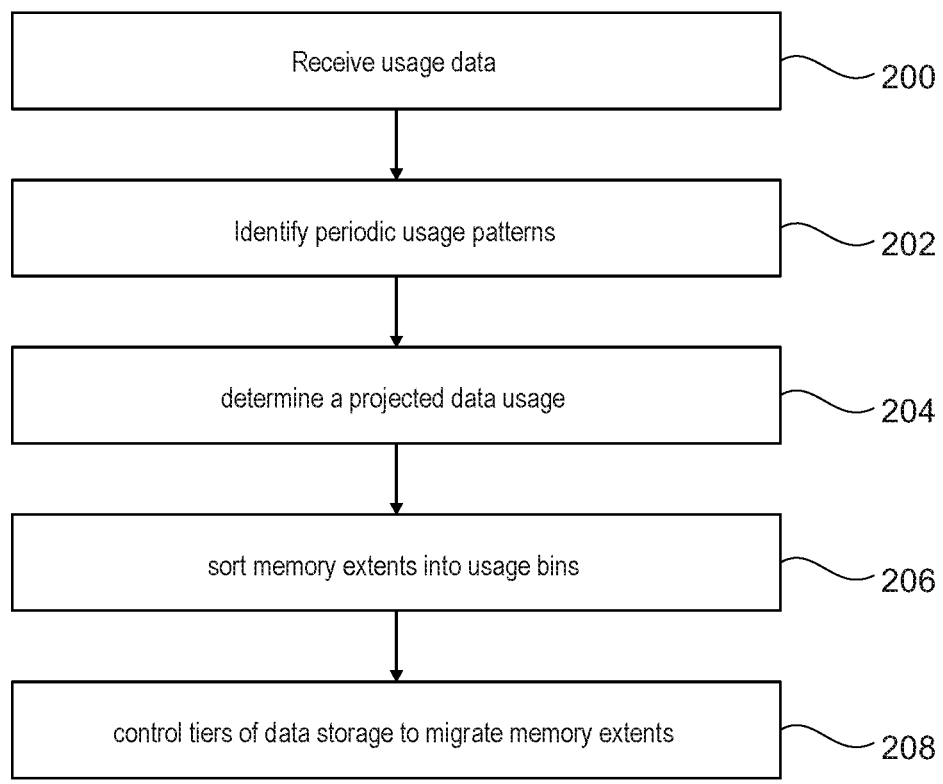
FIG. 2 shows a block diagram that illustrates a method of operating a tiered storage system.

FIG. 2 shows a flowchart which illustrates a method of operating the tiered storage system 100 of FIG. 1. First in step 200 the usage data 124 is received. The usage data is descriptive of the usage of at least one memory extent 114 stored by the tiered storage system 100 in the tiers of data storage 108. Next in step 202 periodic usage patterns 128 are identified for the at least one memory extent 114 at least partially by calculating a correlation coefficient 130 between the usage data 124 and a predetermined list of conditions which could include the optional data stream 126. The list of conditions may also be a list of intervals such as a weekly, bi-weekly, daily, monthly, bi-monthly, quarterly, yearly interval. Next in step 204 the projected data usage 132 is determined for each of the at least one memory extent 114 using the periodic usage pattern 128. Then, in step 206 the at least one memory extents 114 are sorted into usage bins 134 according to the projected data usage 132. This may result in commands to tiers of data storage 136 being generated. Next in step 208 the processor 116 controls the tiers of data storage 108 by sending the commands 138 to the tiers 108.

In another example, the correlation coefficient is a Spearman correlation coefficient. The use of the Spearman correlation coefficient may be useful because it is also able to determine correlations in non-linear relations.

In another example, the periodic usage of the at least one memory extent is at least partially identified by calculating a Fourier transform of the usage data. For example if the usage data is recorded periodically or at distinct time intervals this data may be Fourier transformed to identify periodic usage patterns.

In another example, the periodic usage of the at least one memory extent is at least partially identified by thresholding the Fourier transform. For example after a Fourier transform is performed the thresholds can be used to identify peaks or regions surrounding peaks in the Fourier transformed data.

In another example, the predetermined list of conditions comprises at least one time interval. In this example, the correlation coefficient can be calculated for different time intervals. When the correlation coefficient is above a predetermined or chosen value then it can be seen that the so called periodic usage pattern correlates with a particular time interval. This may be useful because it may require less computational overhead than other means of identifying periodic patterns in data.

In another example, the at least one time interval is any one of the following: a weekly interval, a bi-weekly interval, a daily interval, a monthly interval, a bi-monthly interval, a quarterly interval, a yearly interval, and combinations thereof. Other intervals can for example be determined by taking them from calendars or appointment within a calendar-based system. For example, a firm or consulting company may list certain corporate events such as producing reports in their calendar system. The intervals between these reports or scheduled activities could be used to choose the at least one time interval.

In another example, the predetermined list of conditions comprises an external data stream. In this example an external data stream is used to compare against the periodic usage patterns. For example the value or values within an external data stream may be used to calculate the correlation coefficient to identify the periodic usage pattern.

In another example, the external data stream comprises any one of the following: predicted weather data, a predicted quantity, a rain probability, an external temperature forecast, a frequency of an internet search term, a social media sentiment index, social media meta data, meta data, stock exchange data, a stock trade volume, a short trade volume, a commodity trade value, a stock index value, internet traffic data, traffic data, and combinations thereof.

In another example, the determination of the projected data usage is performed by linear extrapolating maximums of the periodic usage patterns, minimums of the periodic usage patterns, and/or portions of the periodic usage patterns. Portions of the periodic usage patterns as used herein encompass data that models or represents the periodic usage patterns within a predetermined interval of time. The portions of the periodic usage patterns could be the historical heat data identified within an interval of an identified periodic event. The portion of the periodic usage patterns could also encompass averages or running averages of the historical heat data within the interval. An advantage of using the historical data heat is that the time window for the moving average can also be placed temporally ahead of the averaged time. This may eliminate inertial lags in the moving heat average. Once the periodic usage patterns have been determined, the use of a linear extrapolation can be used to extrapolate the occurrence of this particular usage pattern again in the future. A means of doing this which requires very little computational overhead is to identify the maximums of these usage patterns and then to extrapolate them linearly.

In another example, the linear extrapolation is performed using a predetermined number of maximums of the periodic usage pattern, minimums of the periodic usage pattern, maximums of the periodic usage patterns, and/or portions of the periodic usage patterns. To perform the linear extrapolation for example two or more identified maximums may then be used to perform the extrapolation. The use of three or more maximums may provide better results than the use of two maximums.

In another example, the usage data is data heat. Data heat in a storage system may be defined as the back end input or output activity multiplied by the backend response time. The projected data use is a projected data heat. The processor is configured for at least partially sorting the at least one memory extent into usage bins using a moving heat average for each of the at least one memory extent. A predetermined period before either maximums of the projected data usage or minimums of the projected data usage the projected data usage is substituted for the moving heat average during sorting of the at least one memory extent into usage bins. The projected data usage could its self be a moving average of the historical data heat that is substituted for the moving heat average.

In this example, existing algorithms of the tiered storage system may be co-opted. For example in tiered storage systems the data heat is typically calculated for data extents. A moving heat average calculated for a prior period is typically used to identify the heat or how active particular data is. This may be a good strategy if there is only random use of the data. However, if data is used infrequently but then used for intensive periods according to a periodic usage pattern then the use of the moving heat average is very inefficient and it may take time for data currently being used to rise to higher tiers. In this example the moving heat average is then replaced with the projected data usage a period of time before the occurrence of the projected maximum or minimum. This enables memory extents to be moved into appropriate tiers before the periodic usage begins. Projecting the maximums may enable extents to be efficiently moved up to higher tiers. Projecting the minimums may enable extents to be moved to lower tiers when the data is not needed. This may result in more efficient use of the memory extents which are in the tiered storage system.

In another example, the processor is configured for using thresholds of the moving heat average to at least partially determine the sorting of the at least one memory extent into usage bins. The projected data usage may be used for the thresholding instead of the moving heat average.

In another example, the instructions further cause the processor to receive current heat data during one of the maximums of the periodic usage pattern. A model correlation can be calculated between the current heat data and the projected heat data using a Spearman correlation coefficient. If the model correlation is below a predetermined correlation threshold then one of several actions may be performed. A first action that may be performed is disabling the substitution of the maximum of the projected data for the moving heat average. In this example the Spearman correlation coefficient is used to detect a situation where the projected data usage was in fact not accurate. In this case, the behavior of the tiered storage system for this particular memory extent then reverts to the normal moving heat average.

Another step that can be taken if the model correlation is below the predetermined correlation is to repeat the step of identifying periodic usage patterns by calculating the correlation coefficient between the usage data and the predetermined list of conditions. In this case the periodic usage patterns are recalculated or re-determined in response to the model correlation being below the predetermined correlation.

In another case where the model correlation is below the predetermined correlation threshold the step of identifying the periodic usage patterns using the Fourier transform of the usage data is repeated or performed for the first time. The Fourier transform may be useful in rapidly identifying periods that may have been overlooked when for example a list of time intervals was used. The Fourier transform does not have any preconditions so may be useful in identifying time periods that were overlooked.

In another example, the sorting is at least partially dependent upon a priority assigned to each of the at least one memory extent. In this example not only is the projected data usage used to determine into which tiers a memory extent should be sorted, but also a priority which is assigned to the memory extent is used. For example, if there are a large number of memory extents various prescribers or users of the system may give certain memory extents priority or may have paid for better access to their memory extent in a server system. This example enables the priority to be used in addition to the current usage.

In another example, the usage data is received by any one of the following: login usage data, receiving usage data via network connection and retrieving the usage data from a computer storage. So in this example the usage data can be obtained by the processor performing this or also data which may have been used on other systems may also be migrated and then incorporated into the identification of the periodic usage patterns.

In another example, the usage data is the data heat, a number of data accesses, or a volume of data access.

In some examples a possible tiering stack can sometimes contain just 2 tiers (a faster and a slower, or at other times 3 or more tiers.

In some examples, there can also be subtiers, for instance the Flash tier might consist of a highest-performing sub-tier of custom-flash hardware modules, with some less-fast (but still high-performing) Read-Intensive Solid-State Drives.

An Enterprise-Class tier can be subdivided in sub-tiers of 15K-rpm Hard Disk Drives (HDDs), and 10K-rpm HDDs, of SAS or a similar interface. A Nearline tier can be 7,200 rpm SAS, or additionally have 5,400-rpm HDDs, or SATA consumer-class disk drives. A cloud tier can be subdivided also into sub-tiers where one has a private cloud, or tape area, then a nearshore cloud within the same country, and then a cloud somewhere offshore in countries with lower labor costs and/or higher access times.

Usually the lower tiers have a per-Terabyte price which is less expensive. The highest tiers have the best and shortest latency, but due to their price are limited in capacity.

Automated storage tiering now makes administration easier by dividing the volumes into small chunks, or extents, and looking how often each such extent is being accessed. Usually there is a large skew, and certain small parts of the volumes are accessed very often, and should be moved to the highest tiers. Other parts are accessed rarely, and should be placed on the lower tiers. And then there are parts of the volumes, or certain volumes, which are only accessed in certain occasions, e.g. once a month, but then very heavily.

Automated storage tiering measures the "heat" of each such part of the volume, in regular intervals, e.g. each 5 min. "Heat" can be the accumulated response time of all backend I/Os aggregated together i.e. all I/Os which can not be already fulfilled by the cache frontend of the storage system, as it's these backend I/Os which determine how much a certain RAID array (SSD, or HDD) is being utilized. Extent sizes can for instance be between 16 MiB and 1 GiB, so usually smaller than a volume. The storage system is aware of how many backend I/Os can go to each respective storage class RAID rank, and tier. The tiering logic will then sort all the monitored extents into "heat buckets", and make a migration plan, which extent should ideally be on which tier.

Then, this migration plan is carried out, and the process starts all over again, in an ongoing fashion.

Determining a "heat" figure for each sub-volume extent is usually just done by observation of the past access behavior, and this past behavior is mostly used to make the prediction that the very same extents will also have a similar heat value in the near future. But this method—as it mostly averages the amount of accesses to a certain extent in the near past—has severe drawbacks, especially when there are accesses which only occur very rarely (e.g. once a week, once a month, once a quarter) and then heavily, as the "heat" predictions based on immediate past access are wrong and disregard time patterns or other information that could be used to see some heavy upcoming access patterns, and the extent might be in a tier still which is far too low. Performance difficulties may arise trying to access the extent there, with lower tiers hitting their utilization limits getting a sudden very heavy access.

Some examples may use either I/O time access behavior patterns, or other external information with a predictive behavior, or predefined patterns can be used to make a heat prediction for a certain extent which is much more accurate and allows it in advance to be placed onto the right tier, before a potential heavy access is upcoming.

Current tiering systems may use an Exponential Moving Averages ("EMA") to do a statistical analysis on the past accesses (number of I/Os, multiplied with respective back-end I/O response times; also taking into account special workload profiles that favors (or, discourage) being moved to certain tiers, like: Read:Write ratios, random:sequential access ratios, block sizes, or throughput bandwidths).

Various timing windows exist for both data collection (e.g. each 5 min) as well as for making the different migration plans for the extents (e.g. all few hours). Various thresholds exist for the condition to move an extent one tier upwards or to swap it—may need to make sure that the movement itself does not cause performance degradations, that this extent will really perform better on the new extent from a permanent perspective, and that the target tier won't get overloaded with too many hot extents. The storage systems are aware of the internal limits on each tier.

A drawback of using the EMA is that the EMA of the "heat" of each extent is a measurement just for the immediate past, with less statistical weight for each previous day. How often this extent was being touched 3 days ago has already a rather low statistical weight, and if not being accessed for 14 days, the EMA heat value (accumulated backend response time of all I/O accesses in a certain period) might have gone to practically zero.

Examples may have one or more of the following features: identification of in time reoccurring extent access patterns; identification of the related periods of the extent accesses; extrapolation of the identified periods into the future; identification of the best time to proactively start the migration; adjustment of the analytic calculation results with reality; and continuous adaption of the analytic extrapolation to new conditions.

Some examples may enhance the heat determination of existing modules for automated storage tiering with predictive and analytical methods already directly within the storage system, thereby sharply improving the suggested heat accuracy for each extent and/or volume. Both time access behavior patterns are immediately taken into account when collecting statistics, as well as patterns of existing similar applications. The main disadvantages of the Exponential Moving Average statistics, that it is based on past learning and that it also averages out very low and very high values, are avoided. Examples may provide for a method of how to factor in external data which one suspects will have an immediate upcoming impact on future accesses of certain files. Furthermore, examples may provide for a method of how to factor in or use predictive external data, and, if a correlation is found, how to use these in further enhancing the prediction of the heat data for each extent and volume. A special correlation coefficient is used to determine the relevance of either certain time behavior patterns onto the I/O access of a certain extent (e.g. daily, weekly, monthly, quarterly, yearly patterns) as well as to external data coming in, to decide if these should be used for further heat prediction or not.

An example method may contain one or more of the following steps: identification of periodic extent access patterns; identification of the related periods of the extent accesses; extrapolation of the identified periods into the future; identification of the best time to proactively start the migration; adjustments of the analytic calculation result with reality; and continuous adaption of the analytic extrapolation to new conditions.

Figure 3:
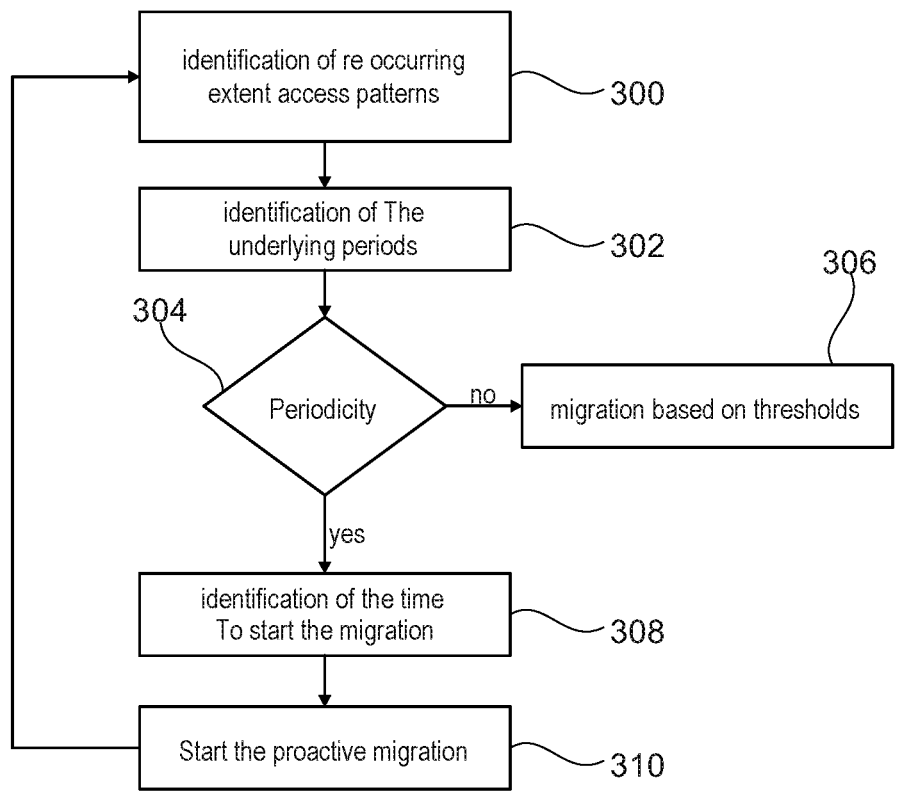
FIG. 3 shows a block diagram that illustrates a further method of operating a tiered storage system.

FIG. 3 shows a block diagram that illustrates some of the above steps and provides a method of migrating memory extents between tiers of storage. First in step 300 there is identification of recurring extent of access patterns. Next in step 302 there is identification of underlying periods. The method then proceeds to step 304 which is a question box which is a determination if there is periodicity or not. If there is no periodicity the method proceeds to step 306 and a migration based on thresholds is used. The migration may be an auto-tiering migration. If there is periodicity then the method proceeds to step 308 and there is identification of the time to start the migration. Next in step 310 the proactive migration is begun. The method then proceeds back to step 300.

Figure 4:
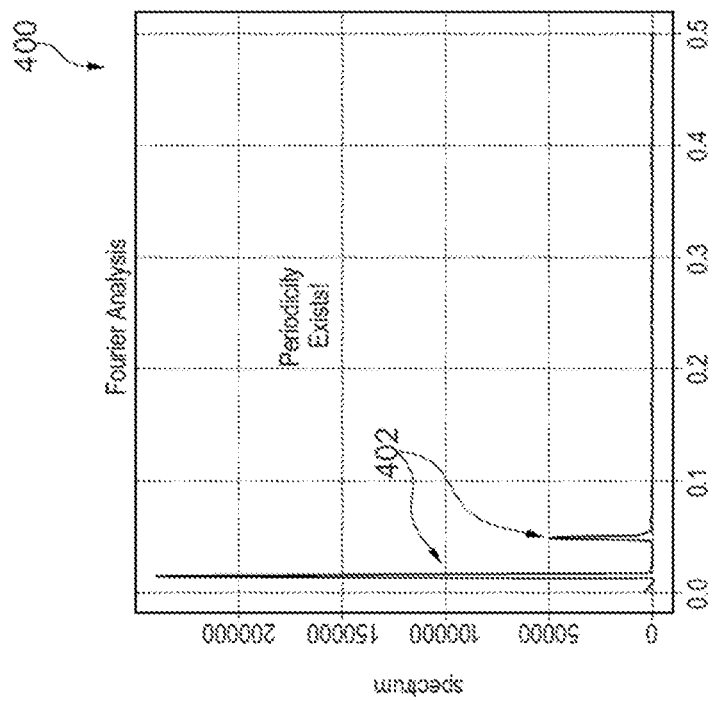
FIG. 4 illustrates an example of usage data and a Fourier transform of the usage data.
Figure 4:
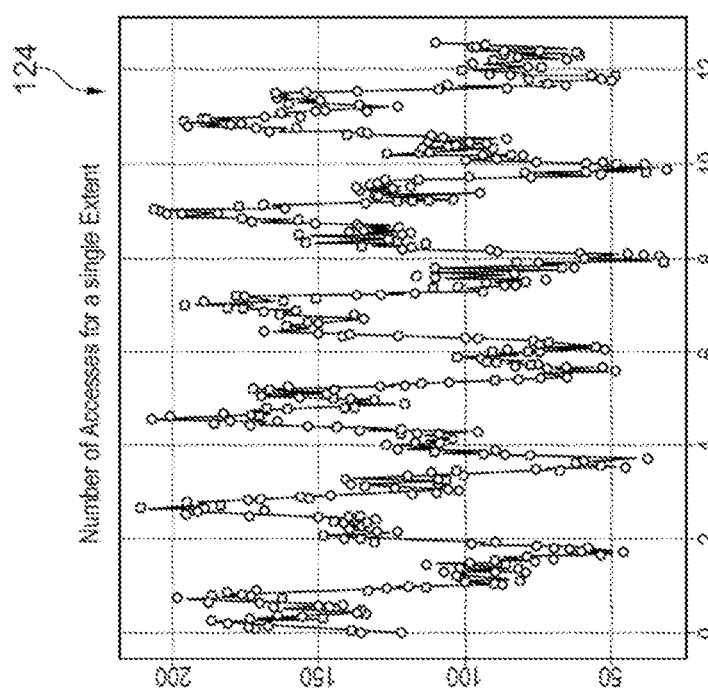

FIG. 4 illustrates an example of identifying periodic usage patterns using a Fourier transform. Two charts are shown. The first chart 124 is an example of usage data that is in the form of number of accesses to a memory system. Plot 400 is a Fourier transform of the data 124. It can be seen that there are two periodic events which are identified by the peaks 402.

Figure 5:
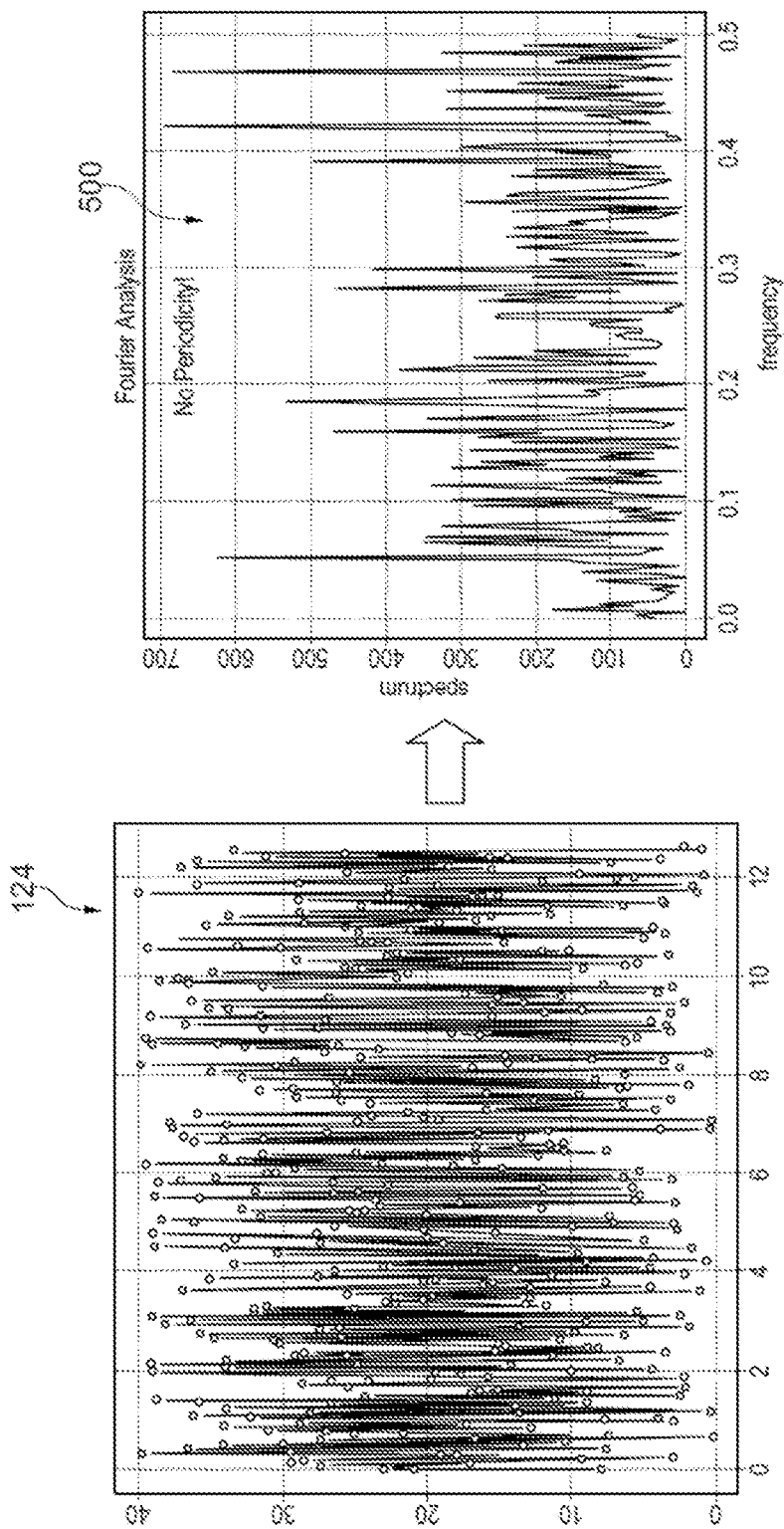
FIG. 5 illustrates a further example of usage data and a Fourier transform of the usage data.

FIG. 5 shows an example where the Fourier transform does not identify periodicity. Again, a chart 124 is shown that illustrates an example of usage data. 500 shows a Fourier transform of the data 124 in this Fig. Examining the Fourier transform 500 it can be seen that there does not appear to be any periodicity identified by the Fourier transform.

Step 1) Identify Periodic Extent Access Patterns (300):

FIG. 4 shows an example of a periodic workload pattern. In this example, two separate oscillating workloads are shown together with noise. This pattern was spectrum-analyzed (Fourier) as is shown in FIG. 5. As a result, one sees in this example two peaks representing the two existing periods. From the existence of peaks in the spectrum, one can conclude that a periodicity exists.

Step 2) Identification of the Related Periods of the Extent Accesses (302):

By analyzing the peaks, the quality of the periodicity can be determined. FIG. 5 shows an example workload without any periodic pattern. Here the spectral analysis shows multiple peaks without significance.

Step 3) Extrapolation of the Identified Periods into the Future (304):

From the spectral analysis, e.g. see FIG. 4, the periodic workloads can be separated and extrapolated into the future. The separated ideal workload patterns are outlined in FIG. 6 and FIG. 7 below.

Figure 6:
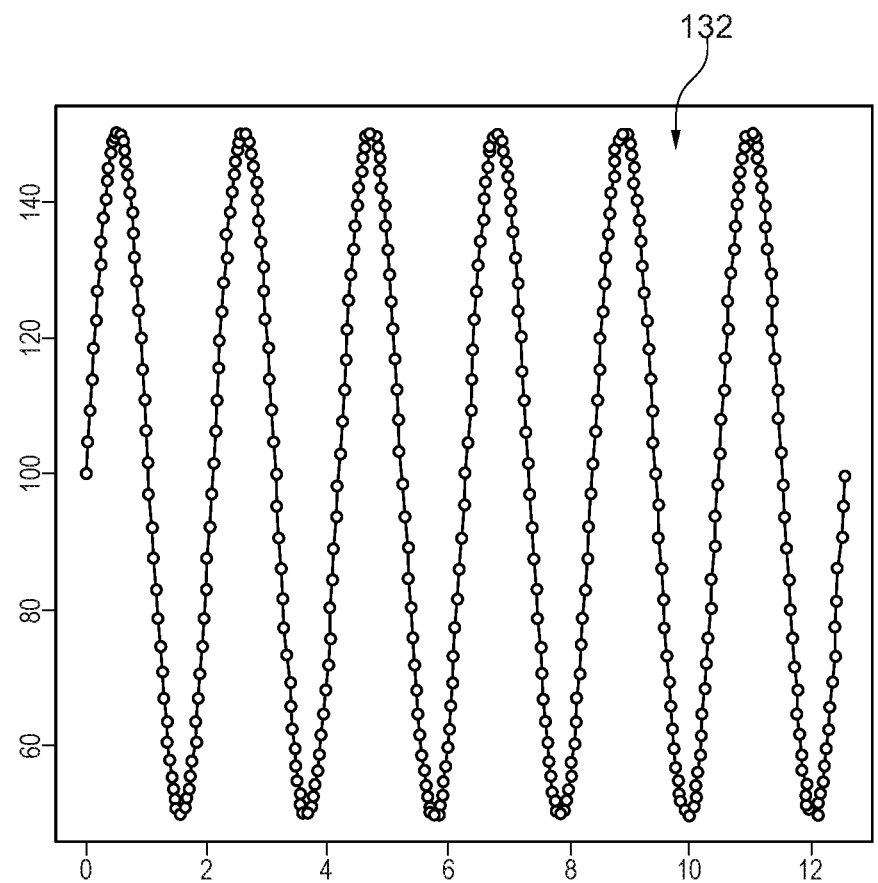
FIG. 6 illustrates an example of predicted usage data.

FIG. 6 shows an example of projected data usage 132 that was calculated using a Fourier transform. In FIG. 4 the plot 400 shows two peaks. The first and largest peak was used to calculate the sinusoidal waveform illustrated in the plot 132 in FIG. 6. The projected data usage 132 shown in FIG. 6 may be used to accurately predict data usage of the extent.

Figure 7:
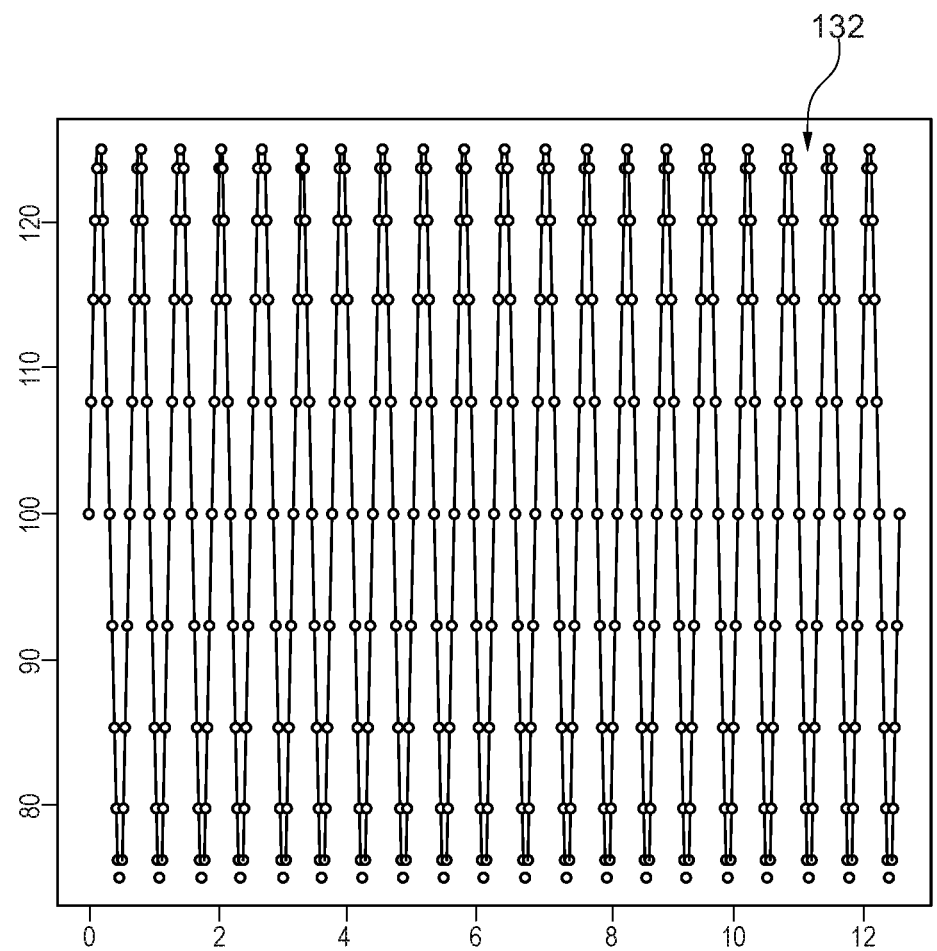
FIG. 7 illustrates a further example of usage data.

FIG. 7 shows a further projected data usage 132. The Fourier transform 400 in FIG. 4 showed two peaks. The projected data usage 132 is a sinusoidal pattern that was calculated using the second and smaller peak 402 from plot 400. The projected data usage 132 in FIG. 7 may also be used to accurately predict data usage by an extent.

With this extrapolation into the future being available the migration process can start the migration prior the threshold trigger is being reached.

Step 4) Identification of the Best Time to Proactively Start the Migration (308):

From the knowledge of the periodic extrapolation into the future, one can determine the optimized migration time. From the extrapolation the times the thresholds are exceeded are known: Threshold time:=Thr. The migration time is also know from the machine: Migration time:=Mt. In turn the optimized migration start point (MigSp) can be determined as follows:

$$MigSp=Thr-Mt$$

Step 5) Adjustments of the Analytic Calculation Result with Reality:

Step 1 may be regularly repeated and the result will be compared to the current model. In case discrepancies are detected the model will be adjusted. Otherwise, everything can stay unchanged.

Step 6) Continuous Adaption of the Analytic Extrapolation to New Conditions:

Step 6 is performed where step 5 identifies any of the following changes: spectrum changes were identified (see FIG. 4); additional peals appear; or peaks disappear.

In such a case, step 4 will be performed again to obtain an optimum extrapolation into the future taking into account the changed conditions.

In addition some examples may have the possibility not only to just determine heat maps based on previous I/O access, or using an API to an outside database which feeds in the heat for certain parts of files or file sets, but which identifies either time behavior access patterns that it extrapolates into the future, or it compares the accesses seen to preexisting access patterns of typical common applications which it then can use to extend heat predictions into the future, or it can draw in and work with streams of data which will likely have an immediate near-time effect on the heat of certain files that can then be taken into account, or it can correlate with externally incoming data streams which can be predictions in itself (e.g., weather data) and, when correlation is found of such data to the intensity of I/O accesses to certain file extents, these correlations may be used to make heat predictions for the file extents based on the external prediction data.

The above described examples may consists of a mix of prior-art automated tiering, like using Exponential Moving Averages of the past I/O access to a certain file extent as a heatmap information for what is upcoming, or some extra mitigation plan of what is to be done in case of unwanted overloads seen (e.g., if already too many hot extents had been moved to the most upper tiers, so these have reached their utilization limits), in combination together with new additional steps and logics which check first for correlations to certain day-time access patterns (daily ups and downs) that can be extrapolated, or: day-of-week, weekly, time of month, time in quarter, and time of year. E.g. if it is seen that at the beginning of each quarter certain files are very heavily accessed (because some internal reporting for management or stock exchange is prepared), and this is a repeating pattern, then such a correlation if found repeating will, from then on, be used to move up these very extents to the most upper tiers, already shortly before the heavy access will occur. And in return, while having very low access, e.g. on ordinary Sundays in each quarter, such very low access at certain periods will be recognized and used to extrapolate into the future, move such extents to very cold tiers in advance, to allow other applications and extents using the high-performing tiers during that time.

Figure 8:
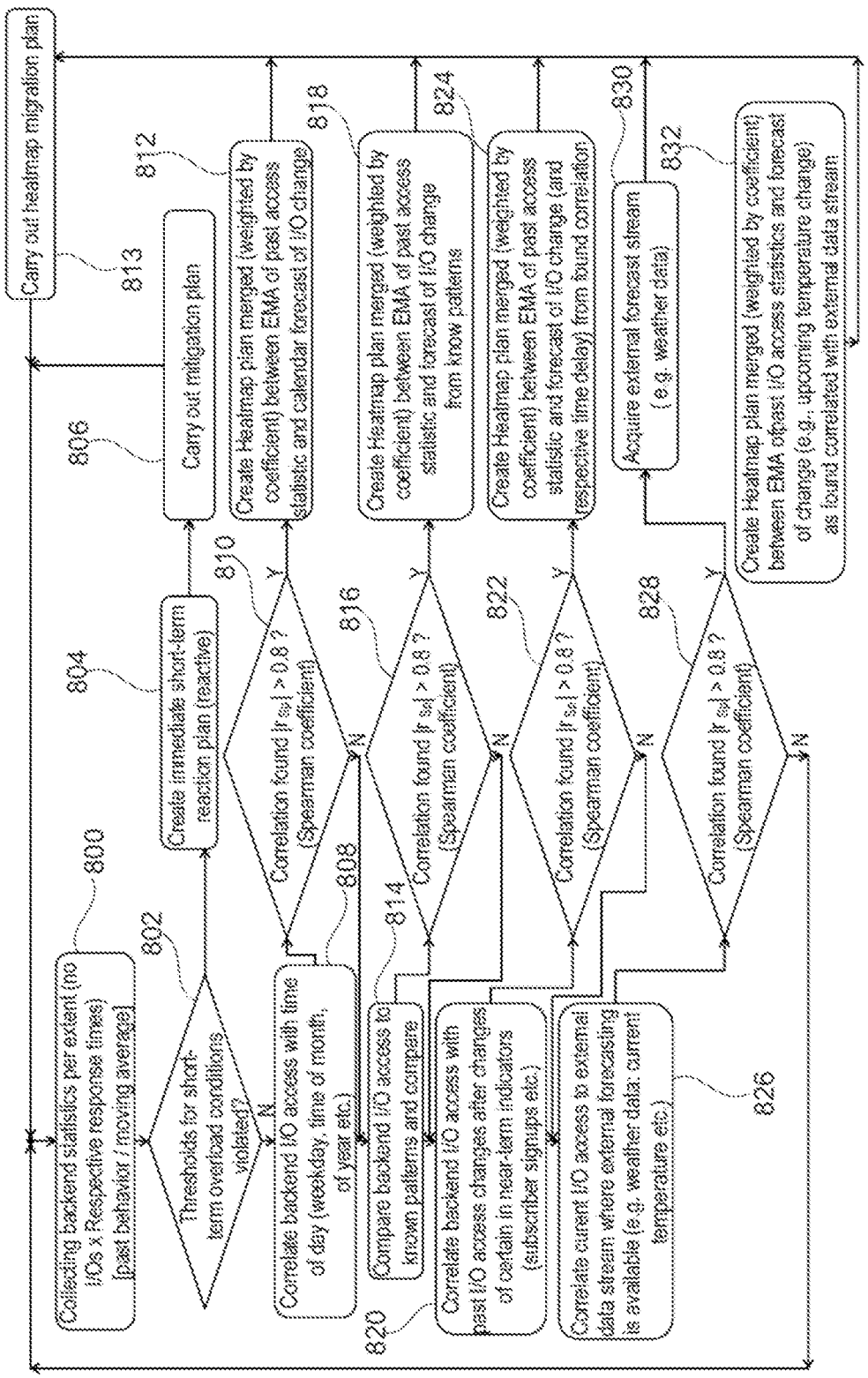
FIG. 8 shows a block diagram that illustrates a further method of operating a tiered storage system.

FIG. 8 shows a flowchart which illustrates a further method of migrating extents in a tiered storage system. The method starts in step 800. In step 800 backend statistics are collected for each extent. This may for example be the number of I/O's or inputs/outputs, time, respective response times. These backend statistics may also include past behavior and a moving average. The method then proceeds to step 802. In step 802 a threshold condition for short term overload is checked. If there is a short term overload the method proceeds to step 804. In step 804 an immediate and reactive short term reaction plan is created. Next in step 806 the short term reaction plan is carried out to mitigate the overload condition. The method then proceeds from step 806 back to step 800.

Returning to step 802, if the thresholds for short term overload are not valid the method proceeds to step 808. In step 808 the backend IO access is correlated with the time of day such as the weekday, time of month, time of year or other time intervals. The method then proceeds to step 810. If there is a correlation found that is above a predetermined threshold the method proceeds to step 812. If there is no correlation the method proceeds to step 814. For example the correlation could be a Spearman coefficient and the predetermined threshold could for example be above 0.8. In step 812 a create heat map plan is merged between the EMA of past access statistics and calendar forecasts of IO change. This may be done with a weighting by a coefficient. The method then proceeds to step 813 which is to carry out the heat map mitigation plan. After step 813 the method proceeds back to step 800.

Returning to step 810, if there is no correlation found the method proceeds to step 814. In step 814 a comparison between the backend IO access to known patterns is made and compared. The method proceeds to step 816. In step 816, if there is correlation between the known patterns and the backend IO patterns step 818 is performed. For example, if the pattern is above a predetermined correlation coefficient such as a Spearman coefficient above 0.8 then the method proceeds to step 818. In step 818 a create heat map plan is merged between the EMA of past access statistics and forecast IO change from known patterns. Again, this may be weighted by coefficients. After step 818 the method then proceeds again to step 813. After step 813 the method then proceeds to step 800 again.

Returning to step 816, if there is no correlation found the method proceeds to step 820. In step 820 the backend IO access is correlated with past IO access changes after changes of certain near term indicators such as subscriber sign ups and other such indicators. The method then proceeds to step 822. In step 822 it is checked to see if there is a correlation coefficient above a predetermined threshold between the backend IO access with past IO access changes. This for example could be a Spearman coefficient above 0.8. If there is a correlation found the method proceeds to step 824. In this a create heat map plan is merged between the EMA of past access statistics and forecast IO changes from found correlations. This may be for respective time delays and may again be weighted by coefficients. After step 824 the method proceeds to step 813 and then back to step 800 again. If there is no correlation found, the method may proceed from step 822 to step 826. In step 826 there is a correlation between the IO access to external data stream where external forecasting is available such as weather data or current temperatures etc. is calculated. The method proceeds to step 828, if there is a correlation found the method proceeds to step 830 and requires external forecast streams such as weather data. The method then proceeds to step 832 to create a heat map plan that is merged between the EMA of past IO access statistics and forecast of change, for example the upcoming temperature change as found correlated with external data stream. After step 832 the method proceeds again to step 813. After step 813 the method restarts in step 800. If there are no correlations found in step 828 the method returns back to step 800. The step 830 may be performed before step 826 is performed also. It should also be noted that steps 808, 814, 820 and 826 may all be performed in parallel.

As in FIG. 8, apart from and following the exponential averaging, first it is checked that there are no short-term overload conditions and respective thresholds for utilizations at certain tiers, or backend response times, already violated—if yes, a mitigation plan with highest priority will be carried out (short-term reactive). If however all utilization levels still allow ordinary automated tiering, the next step of such an apparatus and method is to check for correlation to I/O access intensity regarding certain times-of-day, certain weekdays, certain days of month, days in a quarter, and certain days of year. For that, the tiering logic, which sits inside the storage system, has some calendar built in. The correlation can be established in a way like this, for instance for a weekly access pattern: For initial three weeks in a row, the tiering logic monitors the weekly ups and downs in the intensity of the I/O access, to each file extent in the backend. The results of these 3 weeks are then, for each certain points in a week, linearly extrapolated into the 4th week (e.g., all accesses of Mondays 10:15 h in weeks 1,2,3 will be used to make the prediction for the Monday 10:15 h in week 4. The accesses of Saturday 21:15 h in weeks 1,2,3 will be used to make a prediction for the 4th Saturday 21:15 h, of this file extent). In the fourth week then, and while the monitoring continues, a correlation is done between what has been predicted for this 4th week, versus the measured actual results of this 4th week. It is suggested to use the Spearman rank correlation for this, as it works better with non-linear relations, than other correlations like Pearson. For a formula to calculate the Spearman coefficient.

If the absolute value of this Spearman correlation coefficient, |rSp| is found >0.8, then a correlation is assumed from now on i.e. in this case a weekly access pattern. Once such a correlation has been established, it can then be used to do the prediction for the 5th and all further upcoming weeks, moving the observed period gradually forward also. As this prediction will contain all weekly ups and downs in this case, it will be a lot more exact than using the initial averaging.

As an alternative to using |rSp| is found >0.8, any one the following criteria may alternatively be used when the Spearman correlation coefficient is mentioned in any of the prior examples: |rSp|>0.65, |rSp|>0.7, |rSp|>0.75, |rSp|>0.85, and |rSp|>0.9.

Similarly this can be done for the longer timescales, e.g. establishing correlations on monthly, quarterly or yearly base. Instead of looking at each 5-min or 10-min sampling period, in order to come to yearly access patterns, some averaging e.g. hourly accesses or I/O over a day could be used, to save metadata stored.

The methods of this form of time prediction and the simple day-to-day Exponential Moving Average can also be mixed from then on, e.g. by weighing the influence of the predictive component with the height of the correlation coefficient found.

For stretching out the pattern found into the future, here again some new form of exponential averaging can apply: E.g. after correlation with a weekly pattern is found, instead of just linearly extrapolating 3 weeks into the 4th, one can also decide based on this weekly pattern that the Saturday 21:15 h access prediction for next week will alternatively be consisting of the access patterns of all previous Saturdays 21:15 h, with lower statistical weights respectively.

After checking for certain time access patterns, it can be checked for known access behavior patterns which are predefined. For instance for video streaming, and the access pattern is so far is found to be typical for a certain genre (e.g., crime movie). Then one may know from previous patterns that such similar crime movies will be accessed heavily at certain times of the week (e.g., Saturday evening), or time of the year (e.g., Easter) one can move such files of file extents already up to the high tier before such a peak access time comes, even before that time of the year, and have a shorter learning period. Or if one detects similarity (correlation) to a pattern that stands for a balance-sheet reporting application which is very busy once a quarter, one can also act accordingly.

After checking for patterns, examples may use incoming data streams, which either contain data that are likely to influence access behavior in the near future, or which already consists of prediction data itself.

One example is the number of subscribers, and their respective known access profiles, to a certain service. E.g. when assuming video streaming with pay-per-view, and one already know that a certain amount of additional users (of a certain gender, age and stated interest scope) will lead to additional I/O access onto a certain group of files, then when observing the data stream for the sign-ups to the service the found correlation of this data stream to the amount of I/O accesses can be used to determine heat I/O access for the near future. Other external data streams which can be used to check for correlation to I/O access data, can be for instance: Twitter mentions of my company (e.g. when in context with certain content like "banking slow", this can be used to increase the heat values to all applications whose extents follow patterns for a banking application), Social Sentiment Index and other Social Media data, Stock exchange data (stock quote curve, no. of shares traded curve); traffic data (no. of vehicles per hour at a certain point, to predict a traffic jam at another point). The tiering logic can look for correlations to the I/O access at each file extent, and, if found, use that respective external data streams for appropriate predictions from now on.

And another category of data are such for which already the external data stream is a prediction, e.g. weather data. Like there is: Temperature forecast, rain probability, wind speed, and similar predicted curves. For instance, an ice cream factory will have a heavy demand impact to their products based on the external temperature forecast and also with influence of the rain probability, and this product demand can translate into the IT's I/O also. The automated tiering logic can use such input data (e.g., of the current weather/temperature etc.) to check if there is any correlation, and on which time scale (e.g., how many days in advance), and if established, can continue to use external predictions of such weather data for its own predictions of the heat of every file extent, and manage the tiering accordingly.

Another example for external predictions are also earthquake likelihood data (or again: wind speeds), if the storage tiering is not just understood in terms of performance tiering, but also in terms of availability tiering: If the external predictions for such data go over certain thresholds, this could simply set an additional trigger to either move the stored data to another (more distant, or more safe) data storage domain, or to duplicate data automatically in advance.

Figure 9:
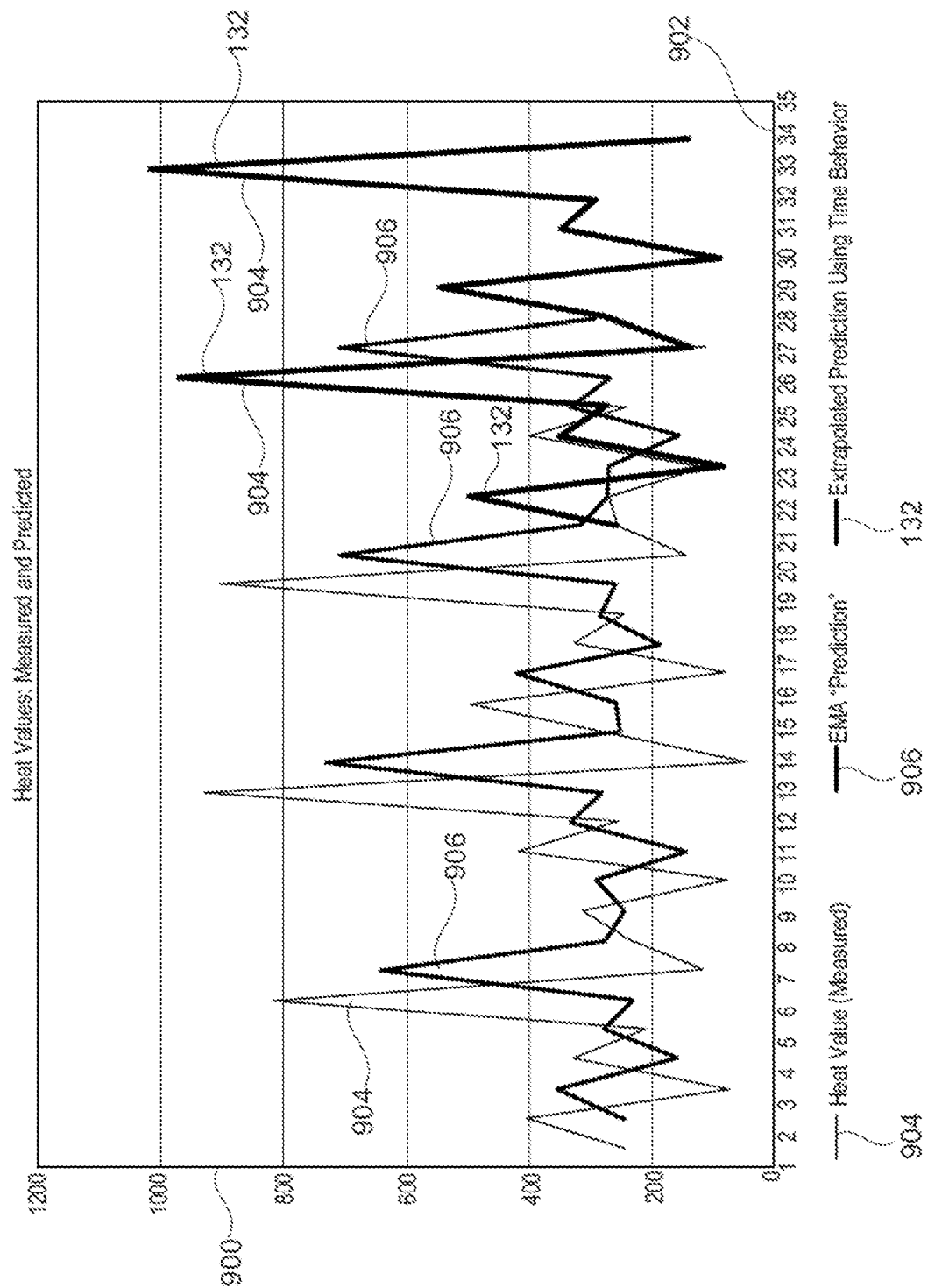
FIG. 9 shows a plot that compares measured usage data, a moving average of the usage data, and predicted usage data.

FIG. 9 shows for the initial example of detecting a weekly pattern, how this could be implemented and solved with statistical mathematics. First, three weeks are observed in a row, with sampling periods of e.g. 5 or 15 minutes (here, 5 minutes; for simplicity however, just one sample per day is shown). This is done at every extent (chunk) of sub-volume data. To come to the values in the 4th week, a linear extrapolation is used of the values in weeks 1,2,3, of the respective same days in the week and times-of-day. With the naked eye, already easily a weekly access pattern can be determined. This is also established mathematically be calculating the Spearman coefficient for the 4th week of the linear extrapolation of these data, versus the real data seen in the 4th week. As the coefficient is found to be high (absolute value >0.8), the correlation is clearly established and therefore then a weekly access pattern and the extrapolations as such can be used for the 5th and all further weeks, using the data of the respective weeks before, until the coefficient remains high enough to support this correlation found.

FIG. 9 shows a plot of heat values 900 as a function of time intervals 902. A plot of a heat value 904 for a particular memory extent is plotted. The access or heat value for this memory extent is shown as being periodic in nature. Additionally there is an EMA prediction 906. The EMA prediction 906 is a moving average prediction. It can be seen that the EMA prediction 906 lags the actual heat value 904. This illustrates that if the EMA prediction 906 is used it will typically be off or delayed from when the memory extent is actually accessed. A projected data usage 132 calculated according to an example is also plotted. It can be seen that the projected data usage 132 more accurately tracks the heat value 904 than does the EMA prediction 906. In fact in many instances in this plot the heat value 904 and the extrapolated prediction 132 are nearly identical.

The invention is a new concept to implement both time behavior detection and prediction, as well as other forms of prediction, into the storage tiering logic of storage systems. Also external data streams can be used. Only when correlations are found, these will be used to make the heat predictions more accurate. This concept provides a competitive advantage for IBM. Implementation of this concept in IBM products would provide a differentiation from our competitors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A tiered storage system comprising:
    two or more tiers of data storage;
    a processor; and
    a memory coupled to the processor, wherein the memory comprises instructions which, when executed by the processor, cause the processor to:
        receive usage data, in real time, descriptive of usage of at least one memory extent stored by the tiered storage system;
        identify periodic usage patterns of the at least one memory extent at least partially by calculating a correlation coefficient between the usage data and a predetermined list of conditions;
        determine a projected data usage for each of the at least one memory extent using the periodic usage patterns, wherein the projected data usage is temporally dependent;
        sort the at least one memory extent into usage bins at least partially according to the projected data usage, wherein the sorting into usage bins is temporally dependent, and wherein the commands sent to the two or more tiers of data storage migrate one or more of the at least one memory extent to a different tier; and
        control the two or more tiers of data storage to migrate the at least one memory extent between the two or more tiers of data storage using temporal changes of the sorting into the usage bins, wherein a time for the migrating is determined based on a projected data usage.

2. The tiered storage system of claim 1, wherein the correlation coefficient is a Spearman correlation coefficient, which may be used to determine correlations in both linear and non-linear relations.

3. The tiered storage system of claim 1, wherein the periodic usage of the at least one memory extent is at least partially identified by calculating a Fourier transform of the usage data.

4. The tiered storage system of claim 3, wherein the periodic usage of the at least one memory extent is at least partially identified by thresholding the Fourier transform to identify a peak or a region surrounding the peak in the Fourier transformed data.

5. The tiered storage system of claim 1, wherein the predetermined list of conditions comprises at least one time interval.

6. The tiered storage system of claim 5, wherein the at least one time intervals is any one of the following: a weekly interval, a bi-weekly interval, a daily interval, a monthly interval, a bimonthly interval, quarterly interval, a yearly interval, and combinations thereof.

7. The tiered storage system of claim 1, wherein the predetermined list of conditions comprises an external data stream.

8. The tiered storage system of claim 7, wherein the external data stream comprises any one of the following: predicted weather data, a predicted quantity, a rain probability, an external temperature forecast, a frequency of an internet search term, a social media sentiment index, social media metadata, metadata, stock exchange data, a stock trade volume, a short trade volume, a commodity trade value, a stock index value, and traffic data.

9. The tiered storage system of claim 1, wherein determination of the projected data usage is performed by linearly extrapolating maximums of the periodic usage patterns, minimums of the periodic usage patterns, and/or portions of the periodic usage patterns.

10. The tiered storage of claim 9, wherein the linear extrapolation is preformed using a predetermined number of maximums of the periodic usage patterns, minimums of the periodic usage patterns, and/or portions of the periodic usage patterns.

11. The tiered storage of claim 9, wherein the usage data is a data heat, wherein the projected data usage is a projected data heat, wherein the processor is configured for at least partially sorting the at least one memory extent into usage bins by using a moving heat average for each of the at least one memory extent, wherein a predetermined period before maximums of the projected data usage the projected data usage is substituted for the moving heat average during sorting of the at least one memory extent into usage bins.

12. The tiered storage of claim 11, wherein the processor is configured for using thresholds of the moving heat average to at least partially determine the sorting of the at least one memory extent into usage bins.

13. The tiered storage of claim 11, wherein the instructions further cause the processor to receive a current data heat during one of the maximums of the periodic usage pattern, wherein a model correlation is calculated between the current data heat and the projected data heat using a Spearman correlation coefficient, wherein if the model correlation is below a predetermined correlation threshold the performs any one of the following:
 disabling substitution of the maximum of the projected data for the moving heat average, wherein the Spearman correlation is used to detect a situation where the projected data usage was not accurate;
 repeating the step of identifying periodic usage patterns by calculating the correlation coefficient between the usage data and the predetermined list of conditions;
 identifying the step of identifying the period usage patterns using the Fourier transform of the usage data; and combinations thereof.

14. The tiered storage system of claim 1, wherein the sorting is at least partially dependent upon a priority assigned to each of the at least one memory extent.

15. The tiered storage system of claim 1, wherein the usage data is received by any one of the following: logging the usage data, receive usage data via a network connection, and retrieving the usage data from a computer storage.

16. The tiered storage system of claim 1, wherein the usage data is any one of the following: the data heat, a number of data accesses, and a volume of data access.

17. A method of operating a tiered storage system, wherein the tiered storage system comprises two or more tiers of data storage, wherein the method comprises
 receiving usage data, in real time, descriptive of usage of at least one memory extent stored by the tiered storage system;
 identifying periodic usage patterns of the at least one memory extent at least partially by calculating a correlation coefficient between the usage data and a predetermined list of conditions;
 determining a projected data usage for each of the at least one memory extent using the periodic usage patterns, wherein the projected data usage is temporally dependent;
 sorting the at least one memory extent into usage bins at least partially according to the projected data usage, wherein the sorting into usage bins is temporally dependent, and wherein commands sent to the two or more tiers of data storage migrate one or more of the at least one memory extent to a different tier; and
 migrating the at least one memory extent between the two or more tiers of data storage using the usage bins, wherein a time for the migrating is determined based on a projected data usage.

18. A computer program product for operating a tiered storage system, the computer program product comprising a computer readable storage medium having program instructions embodied therewith, wherein the computer readable storage medium is not a transitory signal per se, the program instructions executable by a processor to cause the tiered storage system to perform a method comprising:
 receiving usage data, in real time, descriptive of usage of at least one memory extent stored by the tiered storage system;
 identifying periodic usage patterns of the at least one memory extent at least partially by calculating a correlation coefficient between the usage data and a predetermined list of conditions;
 determining a projected data usage for each of the at least one memory extent using the periodic usage patterns, wherein the projected data usage is temporally dependent;
 sorting the at least one memory extent into usage bins at least partially according to the projected data usage, wherein the sorting into usage bins is temporally dependent, and wherein commands sent to the two or more tiers of data storage migrate one or more of the at least one memory extent to a different tier; and
migrating the at least one memory extent between the two or more tiers of data storage using the usage bins, wherein a time for the migrating is determined based on a projected data usage.

* * * * *